June 20, 1967

L. G. BRADY 3,326,657

ENCLOSURE MEANS IN A GLASS SHEET DRAWING APPARATUS

Filed Oct. 2, 1963

INVENTOR.
Lorman G. Brady
BY
Hobbe & Swope
ATTORNEYS

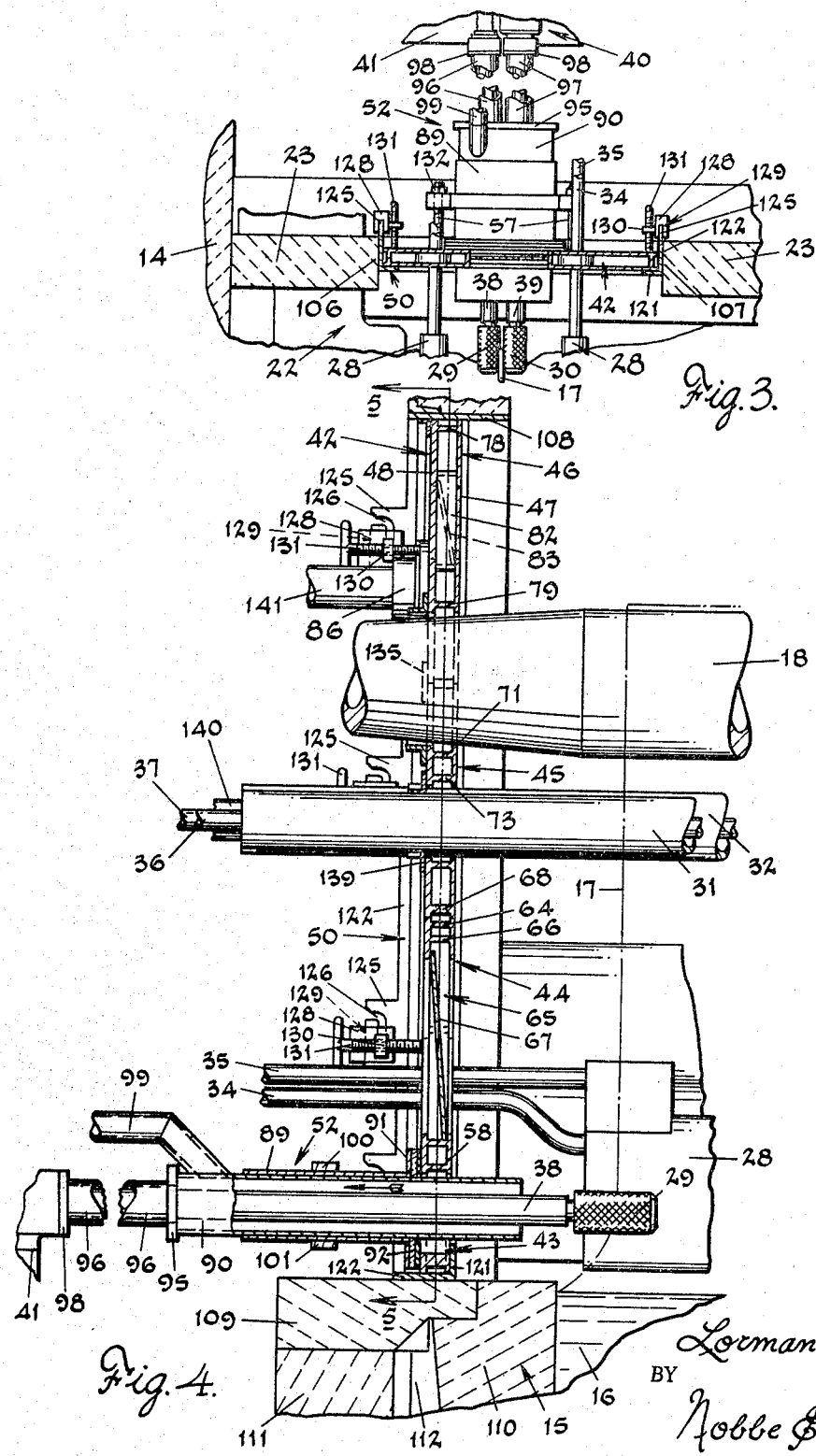

June 20, 1967     L. G. BRADY     3,326,657
ENCLOSURE MEANS IN A GLASS SHEET DRAWING APPARATUS
Filed Oct. 2, 1963     4 Sheets-Sheet 3

INVENTOR.
Lorman G. Brady
BY
Nobbe & Swope
ATTORNEYS

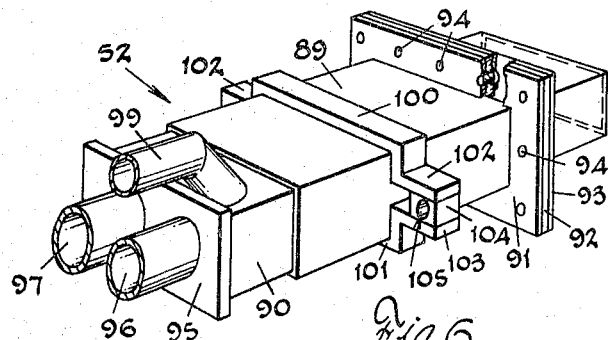
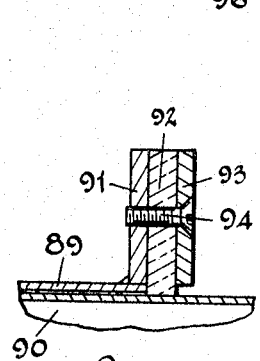
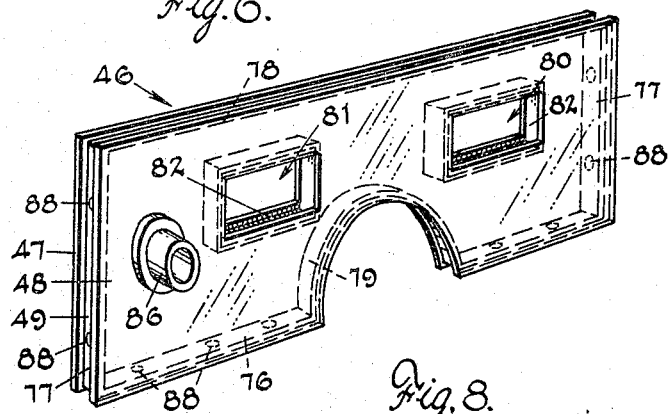
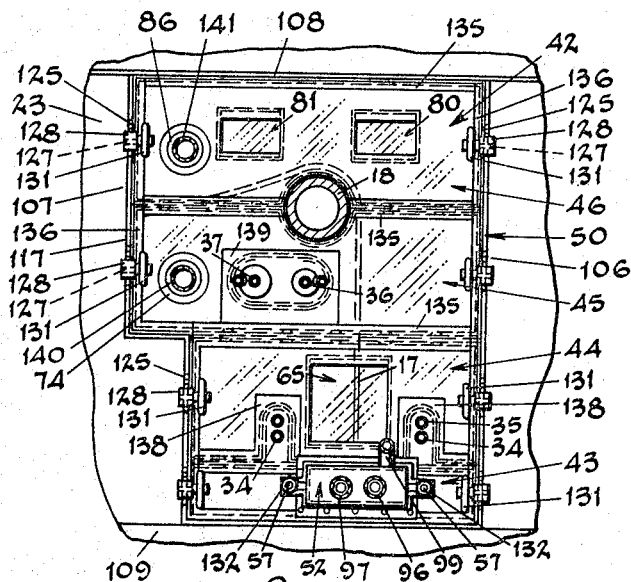

United States Patent Office

3,326,657
Patented June 20, 1967

3,326,657
ENCLOSURE MEANS IN A GLASS SHEET
DRAWING APPARATUS
Lorman G. Brady, Shreveport, La., assignor to Libbey-Owens-Ford Glass Company, Toledo, Ohio, a corporation of Ohio
Filed Oct. 2, 1963, Ser. No. 313,231
13 Claims. (Cl. 65—198)

The present invention relates generally to the manufacture of sheet glass, and more particularly to improved closure means for the drawing chamber of a sheet glass drawing machine.

In the various well-known methods of manufacturing sheet glass by vertical drawing, the glass is drawn upwardly from a molten glass bath in a drawing chamber with the glass sheet emerging from the meniscus formed at the surface of the molten glass. According to the "Colburn" process, the vertically drawn sheet, while still in a semi-plastic condition although substantially set in its final sheet form, is deflected into the horizontal plane about a bending roll and passed over suitable support rolls situated in a so-called flattening chamber into and through an annealing lehr. In another process, the drawn sheet continues upwardly from the drawing chamber into a vertical tower or lehr at the top of which the rising sheet is cut to an appropriate size.

It has been found that in order to make distortion-free sheet glass by vertical drawing it is necessary to avoid local temperature differences in the glass in the region where the glass sheet is being formed. The distortion which occurs in a glass sheet that has been subjected to such local temperature differences is in the nature of waves running longitudinally of the rising sheet. Objects viewed through a sheet of glass having such waves are distorted and particularly so when the objects are viewed through the glass at a relatively sharp angle to the waves.

An important object of this invention is the provision of novel and improved closure means for the drawing chamber of a sheet glass forming machine which will effectively seal the chamber against the entry of outside air into said chamber to thereby minimize the presence of disturbing air currents and avoid local temperature differences in the glass sheet as it is being formed.

Another object of the invention is the provision of improved closure means so constructed as to render the machine more easily and accurately controllable as regards temperature and operation, thereby permitting the formation of a sheet of more uniform thickness and flatness and substantially free from waves and other surface defects.

Another object of the invention is the provision of drawing chamber closure means so constructed that the sheet being drawn is effectively protected from dirt, drafts, and other disturbing atmospheric conditions during its formative period and the interior of the chamber maintained at a more constant uniform temperature thereby greatly facilitating the production of a sheet of exceptionably high quality.

A further object of the invention is the provision of an improved closure means of hollow construction having associated therewith means for exhausting air from the vicinity of the inner surface of the closure means to reduce if not eliminate the movement of air currents toward the newly formed glass sheet.

A still further object of the invention is to provide improved drawing chamber closure means comprised of a plurality of inter-related sectional units or panels each of which is formed to sealingly enclose certain of the components of the machine while permitting easy and convenient access thereto in the event adjustment, repair or replacement becomes neecssary even while said machine is in continuous operation.

Other objects and advantages of the invention will become more apparent during the course of the following description when taken in connection with the accompanying drawings.

In the drawings, wherein like numerals are employed to designate like parts throughout the same:

FIG. 3 is a horizontal section taken on line 3—3 of FIG. 2;

FIG. 4 is an enlarged transverse vertical section taken on line 4—4 of FIG. 2;

FIG. 6 is a perspective view of a knurled roll shaft housing;

FIG. 7 is a fragmentary sectional view of the housing;

FIG. 8 is a perspective view of a sectional unit of the closure means; and

FIG. 9 is an external side elevation of a closure unit or panel.

Figures 1, 2:
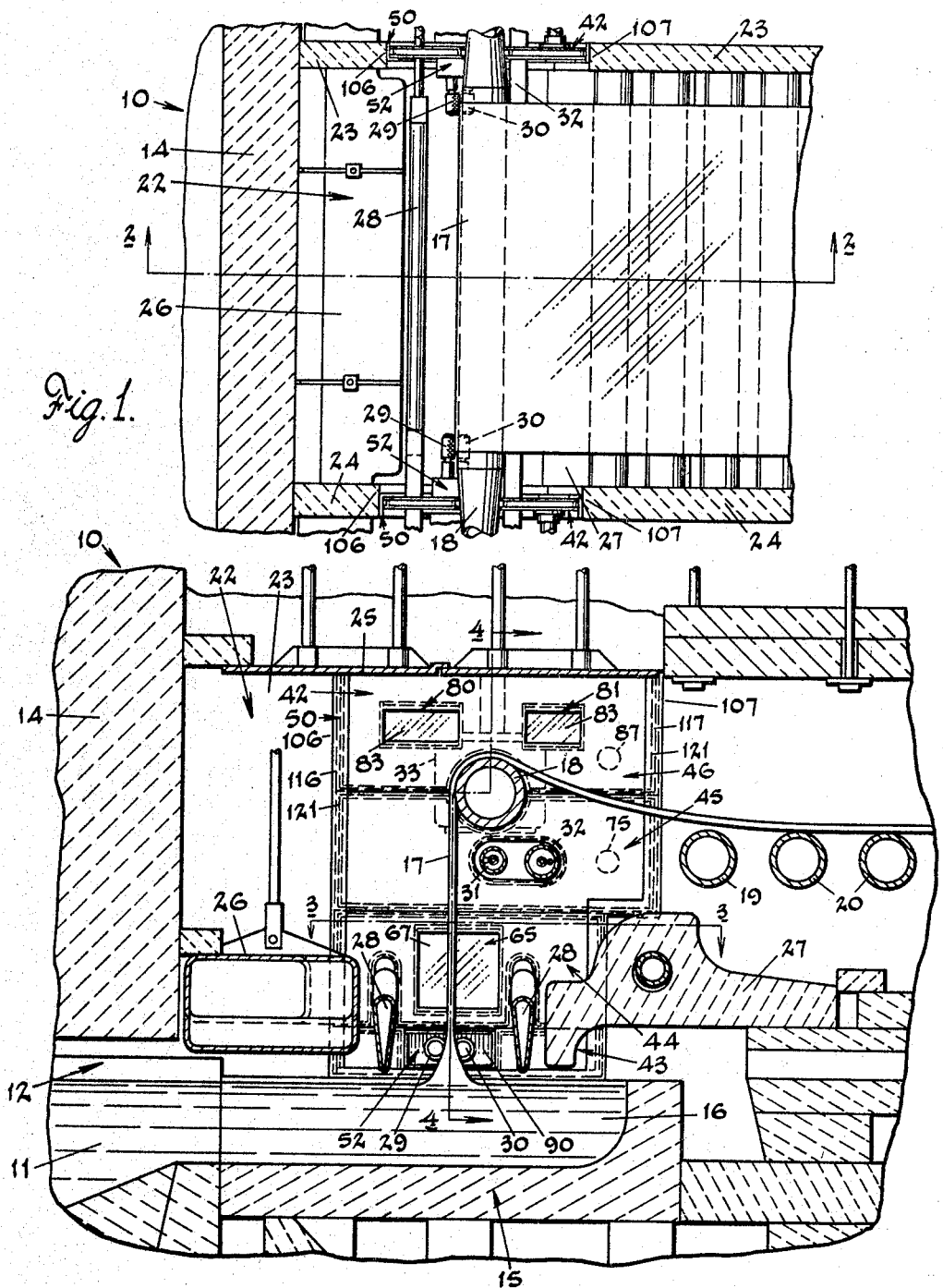
FIG. 1 is a horizontal sectional view of a sheet glass drawing chamber constructed in accordance with the present invention.
FIG. 2 is a longitudinal vertical section taken on line 2—2 of FIG. 1.

With reference now to the drawings and particularly to FIGS. 1 and 2, the numeral 10 designates generally the outlet end of a continuous glass-melting tank-furnace in which a mass of molten glass is melted, refined and cooled to proper working temperature. The molten glass, indicated by the numeral 11, flows from the cooling chamber 12 of the furnace 10 beneath an end wall 14 into a relatively shallow working receptacle or draw-pot 15 to form a bath or pool of molten glass 16 from which a glass sheet or ribbon 17 is continuously drawn. In this respect, and in the particular embodiment illustrated, the sheet or ribbon glass 17 is drawn vertically upwardly from the surface of the bath of molten glass 16 and is deflected into a horizontal plane about a bending roll 18 and then passed over an idler roll 19 onto rolls 20 located in a flattening chamber 21. Upon exit from the flattening chamber, the ribbon passes into and through an annealing lehr (not shown).

The formation of the glass sheet 17 takes place in a so-called working or drawing chamber designated by the numeral 22 and defined by the end furnace wall 14, oppositely disposed side walls 23 and 24 and a roof 25. Arranged above the draw-pot 15 at opposite sides of the glass sheet 17 are front and rear lip-tiles 26 and 27, respectively, which function to direct any rising currents of hot air or other gases downwardly toward the surface of the molten glass 16 and thereby substantially separate the area immediately above the draw-pot from the drawing chamber 22. The lip-tile 27 is of the customary refractory type while lip-tile 26 is preferably composed of metal and consists of a hollow tube substantially rectangular in cross section. The opposed vertical surfaces of the front and rear lip-tiles also define a working area through which the upwardly drawn sheet rises and within this space are hollow metal sheet coolers 28 disposed at opposite sides of the sheet. A suitable cooling medium such as water is circulated through the coolers to reduce the temperature of the air contacting the surfaces of the newly-formed sheet.

The width of the glass sheet 17 as it rises from the bath of molten glass 16 and becomes set in sheet form is maintained by means of oppositely disposed pairs of knurled rollers 29 and 30. Also, means in the form of annular pipes 31 and 32 are provided for cooling the bending roll 18 and shielding same from hot air rising from the molten bath 16.

It will, of course, be appreciated that the working elements or components of the machine within the drawing chamber 22 are extended outwardly through the side walls 23 and 24 thereof so that they can be adequately supported and connected to suitable sources of power, and also to permit ready and convenient installation, removal and/or adjustment. Thus, the bending roll 18 is journaled at its opposite ends in conventional bearing and drive boxes indicated generally at 33. The sheet coolers 28 are provided with inlet and outlet pipes 34 and 35 (FIGS. 3 and 4) at one of their ends for circulating a cooling medium therethrough. This is equally true in connection with the bending roll cooler pipes 31 and 32, the inlet and outlet pipes therefore being indicated at 36 and 37. The pairs of knurl rolls 29 and 30 are mounted at the inner ends of drive shafts 38 and 39 which are connected at their outer ends to a suitable drive mechanism indicated generally at 40 and carried by an adjustably mounted framework 41. As hereinafter to be more fully described, the invention in one aspect contemplates an improved means for receiving those portions of the shafts passing through the respective side walls 23 and 24 into the drawing chamber 22.

According to the present invention, novel closure means are provided for sealing the opposite sides of the drawing chamber 22 to prevent the entrance of dirt and dust and to maintain a more quiescent condition within said chamber. The closure means comprises panels generally designated by the numeral 42 which are fitted in openings in the side walls 23 and 24 of the drawing chamber. Each closure panel 42 is formed of sectional units, designated by the numerals 43, 44, 45, and 46, which are of double wall construction and therefor hollow.

Generally stated, the sectional units which cooperate to form a closure panel are shaped to accommodate the ends of the various working elements, above described, and are therefore more or less "tailored" to properly interfit around the portions of the elements which project outwardly of the drawing chamber. In this connection, it should be understood that the particular shape or outline of the closure panels herein shown and described is not to be considered restrictive of the invention and that changes in the shape, size and location of sectional units of the panels as dictated by the construction and position of the bending roll, knurled roll mountings, sheet cooler supports, etc., can be made without departing from the spirit of the invention.

Each of the sectional units has an inner wall 47 preferably of a high heat reflective metal, such as stainless steel, and a relatively thicker outer wall 48 of a metal such as boiler plate iron or black iron. Likewise in each unit, the inner wall 47 and outer wall 48 are spaced from one another by a substantially continuous and integral peripheral partitioning wall 49 located just slightly inwardly of the edges of the walls 47 and 48 (FIG. 8). The related units include semi-circular or slotted areas which, in the completed panels 42, cooperate to accommodate the projecting ends of the sheet and roll coolers 28 and 31 and 32, respectively, as well as of the bending roll 18. These sectional units when in assembled relation are received and secured in a framework 50 and are dimensioned according to their respective positions in the openings in the side walls. Thus, as seen in FIGS. 2 and 5, the lower unit 43 is considerably narrower or of less height than the units 44, 45 and 46 situated thereabove although these dimensions are to be considered only by way of example and typical of the openings established in the side walls of a drawing chamber.

Figure 5:
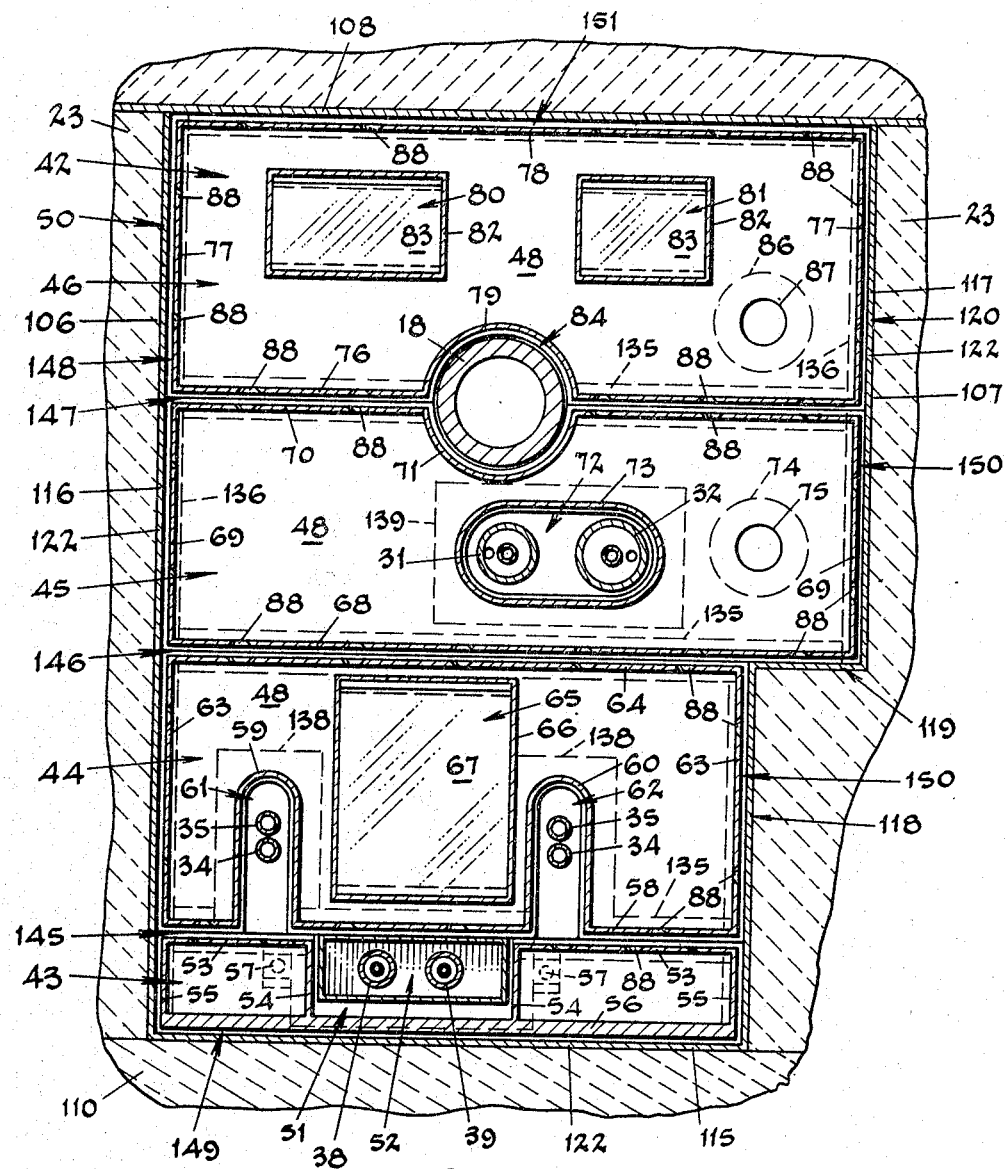
FIG. 5 is a longitudinal vertical section taken on line 5—5 of FIG. 4.

With reference to FIG. 5, the bottom sectional unit 43 is provided with a substantially centrally disposed upwardly opening notch 51 for receiving a knurled roll shaft housing, generally designated by the numeral 52. The partitioning wall 49 of unit 43 is therefore contoured to form top wall portions 53, parallel inner side wall portions 54 and end walls 55, and a bottom wall portion 56. In this connection, it is to be noted that since the wall 56 serves in essence as a base support for the respective panels, it can be materially thicker than the remainder of the partitioning walls. Also, in equally spaced relation to the inner side walls 54 on either side of the notch 51, threaded rods 57 are secured to the outwardly directed surface of the outer wall 48.

The next sectional unit 44, having the same length or horizontal dimension as unit 43, is adapted to receive the end elements 34 and 35 of the sheet coolers 28 and to this end the periphery defining partitioning wall 49 of this unit is formed with a lower wall portion 58 including downwardly open U-shaped portions 59 and 60 outlining notches 61 and 62, end walls 63 and a top wall portion 64. Referring to FIGS. 2 and 5, it will be seen that the portions 59 and 60 are substantially equally spaced from the housing 52 of sectional unit 43 for insertion and positioning of the sheet coolers 28 with reference to the knurled rolls 29 and 30 between which the upwardly rising sheet 17 is drawn. Unit 44 also is formed with an observation opening 65 between notches 61 and 62 with suitably sized openings being made in the inner and outer walls of the unit for receiving a rectangular frame 66 in which a transparent closure, such as the glass sheet 67, is fixed.

The sectional unit 45 and partitioning wall 49 thereof has a lower straight wall portion 68, end walls 69 and a top wall portion 70 generally parallel to the lower wall portion 68. The top wall 70, however, is formed with an upwardly directed semi-circular opening defined by the curved wall portion 71. Also, the unit 45 has an opening 72 enclosed by a suitably shaped frame 73 for receiving the bending roll cooler pipes 31 and 32. The outer wall 48 of the unit 45 has a pipe fitting 74 attached to the outer surface thereof in surrounding relationship to an aperture 75 in such outer wall, which fitting is connected to an exhaust system as will be more fully hereinafter described.

The uppermost sectional unit 46, as also seen in FIG. 8, has a bottom wall portion 76, end walls 77 and a top wall portion 78. The bottom wall portion is formed with a downwardly directed semi-circular opening defined by a suitably shaped wall portion 79. In addition, the unit 46 is provided with observation openings 80 and 81 to enable inspection of the upwardly moving sheet 17 as it is bent about the roll 18 from the vertical to a horizontal plane. These openings are enclosed by frames 82 in which glass sheets 83 are located. When installed, the curved wall portion 71 of the unit 45 and the corresponding curved portion 79 of the unit 46 are positioned with regard to one another to form a substantially circular opening 84 through which the respective ends of the bending roll 18 are passed. As in the case of the unit 45, unit 46 is provided on its outer surface or wall 48 with a pipe fitting 86 encircling an aperture 87 in such outer wall. The partitioning wall 49 of unit 46, as well as those of the other units, is pierced at suitably spaced distances by ports 88 for enabling air flow therebetween.

With further reference now to the knurled roll shaft housing 52, which is best shown in FIGS. 6 and 7, it will be seen to generally comprise an outer substantially rectangular sleeve 89 and an inner sleeve 90 arranged in telescopic relation therein. The outer sleeve 89 at one end thereof is provided with a flange 91 that is adapted to support a strip 92 of insulating material, such as asbestos, in cooperation with a ring-like rectangular plate 93. By means of screws 94, the flange 91 and plate 93 support the strip 92 in clamped relationship therebetween (FIG. 7). The inner sleeve 90 is closed at one of its outer ends by a wall 95, which in turn is provided with openings which register with tubular members or pipes 96 and 97 secured at their ends to the outer surface of the wall 95. As viewed in FIGS. 3 and 4, the pipes 96 and 97 are adapted to be fixed at their opposite ends to plates 98 forming parts of the case of the knurled roll drive mechanism 40. On the upper wall surface of sleeve 90, a pipe 99 is provided to connect the interior of the sleeve to the exhaust system previously mentioned.

To securely mount the knurled roll shaft housing 52 on the related panel 42, the sleeve 89 is provided with substantially U-shaped bars 100 and 101 secured to the upper and lower wall surfaces thereof, respectively. Each of the bars 100 and 101 is formed with outwardly directed lugs 102 and 103 having a cross-drilled block 104 secured therebetween. The spaced relation of the drill holes 105 in each block 104 to one another is the same as the distance between the threaded rods 57 of the sectional unit 43.

Preparatory to installation of the panels 42 within the framework 50, the bending roll 18, the sheet coolers 28 and bending roll cooler pipes 31 and 32 are suitably supported at their opposite ends on the furnace structure outwardly of the side walls 23 and 24 and it will be appreciated that the drawing chamber 22 at this time is exposed to the outside atmosphere through the openings in the side walls. These openings in the embodiment illustrated are defined by a vertically disposed forward edge surface 106, a substantially "stepped" rear edge surface 107 in the vicinity of the opposite ends of the rear lip-tile 27, a head rail 108 of the furnace structure and the cap blocks 109 carried on the upper surface of the side walls 110 of the draw-pot 15 and the outer wall 111 of the heating chamber 112 in which the draw-pot is located.

The framework 50 is of an angular cross section and comprises a substantially U-shaped body having a base 115, a vertically disposed leg 116 disposed adjacent the forward surface 106, and a Z shaped leg 117 including a lower vertical portion 118, a horizontal portion 119 and an upper vertical portion 120 disposed adjacent to and interfitting with the stepped rear edge surface 107. As noted above, the framework 50 is angular in cross section to provide one substantially continuous flange 121 facing inwardly toward the drawing chamber 22 and a flange 122 adapted to conform with and fit into the openings in the side walls 23 and 24. Additionally, the flange 122 of the leg 116 and vertical portions 118 and 120 of leg 117 are equipped with lugs 125 having L-shaped slots 126 therein. Each slot is formed to open outwardly and includes a downwardly directed "blind" end for receiving the crosspin 127 (FIG. 9) of a clamping block 128. Each block 128 has a centrally disposed channel 129 (FIG. 3) fitting over a lug 125 whereby upon insertion of the crosspin 127 into the slot 126 of the lug, the block is movable forwardly and then downwardly until it is firmly mounted. Each block has a threaded projection 130 in which a turn-bolt 131 is located.

During installation of the closure panels 42, the respective frameworks 50 are located in the side wall openings as above described and the flanges 122 sealed by a suitable refractory cement to the adjoining surfaces of the side walls. The lower sectional unit 43 of each closure panel 42 is then fitted into the respective framework 50, resting on the base 115 thereof and between the flanges 122 of vertical leg 116 and the lower vertical portion 118 of leg 117. By means of the turn-bolts 131, with the blocks 128 being carried by the adjacent lugs 125, the inner wall 47 of unit 43 will be firmly positioned against the flange 121 of the framework. The knurled roll shaft housing 52 is located in the notch 51 of the sectional unit and secured therein by insertion of the threaded rods 57 through the holes 105 and tightening of nuts 132 on the outer ends of the rods against the blocks 104. Upon mounting of the knurl drive mechanism 40 and with the drive shafts 38 and 39 mounting the knurl rolls 29 and 30 outwardly of the open end of the sleeve 90, such sleeve is passed through the sleeve 89. When the mechanism 40 is secured in position, the knurls 29 and 30 are thereby properly located within the drawing chamber 22. At this time, the relatively small space between the inner surfaces of the sleeve 89 and the outer surfaces of the sleeve 90 will be sealed by the strip of insulation material 92, as in FIG. 7.

The next sectional unit 44 is then placed on the upper edge of unit 43 with the pipes 34 and 35 of the sheet coolers 28 being received in the respective notches 61 and 62. Bolts 131 of blocks 128 secure the unit 44 firmly in the framework 50 against the flange 121 and between the flanges 122 thereof.

In mounting the next unit 45, the same is passed under the bending roll 18 and over the ends of the bending roll cooler pipes 31 and 32 which are thus located in the opening 72. As above described, the unit 45 is mounted on the unit 44 therebeneath and similarly secured by bolts 131. Finally the uppermost sectional unit 46 is fitted over the end of the bending roll 18 and located on the upper surface of the unit 45 in closely spaced relation to the undersurface of the head rail 108. Positioning of the uppermost sectional units 46 of each closure panel 42 and the securing thereof against the flanges 121 of the frameworks by turn-bolts 131 completes the installation of the panels.

As viewed in FIG. 9, the horizontally disposed joints between the several units as well as the vertical joints at their ends, in engagement with the frame 50, are sealed by a suitable air-impervious heat-resistant material 135 and 136, attached to the outwardly directed surface of the outer wall 48 to reduce if not completely eliminate the ingress or egress of currents of air therethrough. One such material which has proved acceptable in this respect is an alumina silicate fiber with an organic carrier fiber incorporated therein obtainable under the trademark "Fiberfrax." This is also true with regard to the open areas of notches 61 and 62 of the unit 44 and the opening 72 in unit 45, over which strips 138 and 139 of an air-impervious heat-resistant material are applied. The area between the bending roll 18 and the opening 84 formed by the units 45 and 46 can also be, if desired, closed by a suitable gland or like enclosure. In this respect and as earlier mentioned, a strip of insulating material 92 is clampingly held by the outer sleeve 89 of the housing 52. It is now believed apparent that the inner edges of the strip 92 are pressed inwardly against the outer surfaces of the inner sleeve 90 and operate as a "squeegee" to prevent the passage of air while permitting sliding movement of the sleeve 90 during adjustment of the knurl rolls associated therewith.

Upon connection of the panels 40 to a suitable exhaust system by pipes 140 and 141 (FIG. 4) at fittings 74 and 86 and through pipe 99, air will be withdrawn from the several units of each panel and from about the knurled roll shafts.

The use of the novel closure panels of this invention has resulted in minimizing the presence of disturbing air currents in the drawing chamber and localized temperature differences in the glass sheet as it is being formed, both of which conditions have heretofore been responsible for causing distortion in the finished product. This stems from the fact that the desired degree of pressure within the drawing chamber can be more easily and readily maintained due to the several units of each closure panel being substantially completely sealed at their outer surfaces within their respective framework and to one another, and also because of the aspirating effect produced in the drawing chamber resulting from air withdrawal from and through the passageways formed between the opposed partitioning walls 49 of the units and through the ports 88 therein.

To illustrate, such passageways, clearly shown in FIG. 5, are formed as at 145 between the opposed wall portions 53 and 58 of the sectional units 43 and 44; at 146, between the wall portions 64 and 68 of the sectional units 44 and 45; and as at 147 between the opposed wall portions 70 and 76 of the units 45 and 46. These passageways in turn communicate with like passageways at 148 located between the flange 122 of leg 116 of the frame 50 and the vertically aligned end walls 55, 63, 69 and 77; at 149 located between the bottom wall 56 of unit 43 and flange 122 of frame base 115; at 150 located between the flanges 122 of vertical leg portions 118 and 120 and the end walls 55 and 63 of units 43 and 44 and like end walls 69 and 77 of units 45 and 46; and between the top wall portion 78 of sectional unit 46 and the head rail 108 as at 151. By means of the communicating ports 88 in the several wall portions of each unit, the above described passageways are openly connected to the pipe fitting 74 in the sectional unit 45 or the fitting 86 associated with the unit 46.

With the exhaust system in operation, air within the hollow sectional units of the closure panels is continuously drawn outwardly thereof through the above described passageways. Moreover, this evacuation of the air in the passageways produces an aspirating effect which, in turn, serves to some extent to pull air, and particularly that adjacent the inner walls 47 of the panels, from the interior of the drawing chamber through the exposed unsealed joints on such inner walls between the sectional units. Now this air is of a high temperature relative to that of the atmosphere surrounding the drawing chamber and is thus effective to maintain the outer walls 48 at an elevated temperature and discourage cooling thereof, as well as of the atmosphere within the drawing chamber, through conduction of heat therebetween. At the same time, while this air adjacent the inner walls of the panels is relatively hot in comparison with the outside atmosphere, it is cool with relation to the air medial the drawing chamber and adjacent the glass ribbon being formed therein. This is due to the "chimney effect" produced in the chamber which results in the hot air rising, cooling in the upper area of the chamber and then flowing downwardly adjacent the side walls toward the bottom of the chamber. This air flow has been found to be detrimental since it tends to interfere with the desired formation of a quiescent blanket of warm air at the surface of the molten glass bath adjacent the meniscus or point where the sheet is being initially formed. However, with the use of the novel closure panels herein disclosed the "chimney effect" or undesirable currents of cool air is to a great extent minimized by this cooler air flowing adjacent the drawing chamber walls being exhausted outwardly through the passageways in the panels.

This desired condition is further augmented by the exhaustion of air through the sleeves 90 and pipes 99 which takes place in close proximity to the initial formation of the ribbon, and which, in turn, has been found to produce a warming effect on the shafts of the knurled rolls through which a cooling medium is conventionally circulated in order to maintain the knurls at a desired working temperature. This warming of the shafts acts to reduce the chilling effect on the surface of the molten glass therebeneath caused by cooling of the knurls.

It is to be understood that the forms of the invention herewith shown and described are to be taken as illustrative embodiments only of the same, and that various changes in the shape, size and arrangement of parts may be resorted to without departing from the spirit of the invention.

I claim:

1. In a continuous sheet glass furnace comprising a refining chamber, a cooling chamber, and a drawing chamber including a draw pot and having side walls provided with access openings arranged in the area above said draw pot, said chambers being aligned in end-to-end communicating relationship, a mounting frame secured adjacent the periphery of each of said openings, and a closure panel located in each of said openings and interfitting with said mounting frame, said closure panels being formed by spaced walls having an air gap therebetween, said closure panels comprising a plurality of abutting juxtaposed sectional units of double wall construction with said walls being spaced apart by a substantially continuous integral partitioning wall located slightly inwardly of the periphery of said units whereby passageways are formed between the partitioning walls of abutting units and between the mounting frame and the partitioning walls of units abutting said mounting frame, said partitioning walls being pierced at spaced points along their length to provide ports between adjacent units for enabling air flow therebetween, apertures in the outer walls of certain of said sectional units, and means for exhausting air from the interior of all of said units through said apertures.

2. A furnace structure as defined in claim 1, including an air-impervious heat-resistant material on the outer walls of said units over the joints between adjacent units and those between the mounting frame and the units adjacent thereto.

3. A furnace structure as defined in claim 1, wherein said outer wall of said sectional units is composed of boiler plate iron and the inner walls thereof is composed of high heat reflective stainless steel.

4. In a sheet glass drawing machine, a draw pot containing a mass of molten glass, a drawing chamber above said draw pot defining a zone of sheet formation and including side walls provided with access openings, said drawing chamber having working elements located therein including means for drawing a sheet upwardly from said molten glass mass and for maintaining said drawn sheet at a desired width, said working elements including portions which extend through said access openings for support and connection to power sources outwardly of said drawing chamber, a mounting frame secured adjacent the periphery of each of said openings, and a closure panel located in each of said openings and interfitting with said mounting frame, said closure panels comprising a plurality of abutting sectional units of double wall construction including an air space therebetween and which are dimensioned so as to fit together to seal said openings while simultaneously cooperating to provide apertures for receiving said portions of said working elements extending through said openings, the walls of said units being spaced apart by a substantially continuous integral partitioning wall located slightly inwardly of the periphery of said units whereby passageways are formed between the partitioning walls of abutting units and between the mounting frame and the partitioning walls of units abutting said mounting frame, said width maintaining means including pairs of opposed knurled rolls at either side of said sheet and between which the side edges of said sheet passes, said portions of said width maintaining means which extend through said access openings including shafts for driving said rolls, a hollow housing surrounding said shafts and opening into said driving chamber in abutting sealed relationship with said aperture provided in said sectional units for receiving said shafts, and means communicating with the interior of said housing outwardly of said drawing chamber for enabling air withdrawal from the interior of said housing.

5. A sheet glass drawing machine as defined in claim 4, wherein said housing comprises an outer sleeve and an inner sleeve arranged for telescopic movement within said outer sleeve, one end of said outer sleeve being sealed about the periphery of said shafts receiving aperture in said sectional units outwardly of said drawing chamber, said knurled roll shafts extending through said inner sleeve and being fixed relative thereto whereby the position of said rolls within said chamber may be varied by movement of said inner sleeve.

6. A sheet glass drawing machine as defined in claim 5, wherein said means for enabling air withdrawal from said housing comprises a pipe opening into said inner sleeve.

7. A sheet glass drawing machine as defined in claim 6, wherein a flexible air impervious sealing means is provided between said outer and inner sleeves.

8. In a sheet glass drawing machine, a draw pot containing a mass of molten glass, a drawing chamber above said draw pot defining a zone of sheet formation and including side walls provided with access openings, said drawing chamber having working elements located therein including means for drawing a sheet upwardly from said molten glass mass and for maintaining said drawn sheet at a desired width, said working elements including portions which extend through said access openings for support and connection to power sources outwardly of said drawing chamber, a mounting frame secured adjacent the periphery of each of said openings, and a closure panel located in each of said openings and interfitting with said mounting frame, said closure panels comprising a plurality of abutting sectional units of double wall construction including an air space therebetween and which are dimensioned so as to fit together to seal said openings while simultaneously cooperating to provide apertures for receiving said portions of said working elements extending through said openings, the walls of said units being spaced apart by a substantially continuous integral partitioning wall located slightly inwardly of the periphery of said units whereby passageways are formed between the partitioning walls of abutting units and between the mounting frame and the partitioning walls of units abutting said mounting frame, said partitioning walls being pierced at spaced points along their length to provide ports between adjacent units for enabling air flow therebetween, apertures in the outer walls of certain of said sectional units, and means for exhausting air from the interior of all of said units through said apertures.

9. A sheet glass drawing machine as defined in claim 8, including an air-impervious heat-resistant material on the outer walls of said units over the joints between adjacent units and those between the mounting frame and the units adjacent thereto.

10. A furnace structure as defined in claim 8, including a mounting frame secured adjacent the periphery of said access opening and within which said closure panel is received, said closure panel comprising a plurality of abutting juxtaposed sectional units of double wall construction with the walls of each unit being spaced apart by a substantially continuous integral partitioning wall located slightly inwardly of the periphery of said unit whereby passageways are formed between the partitioning walls of abutting units and between the mounting frame and the partitioning walls of units abutting said mounting frame.

11. A furnace structure as defined in claim 10, wherein said partitioning walls are pierced at spaced points along their length to provide ports between adjacent units for enabling air flow therebetween.

12. In a continuous sheet glass furnace comprising a refining chamber, a cooling chamber and a draw-pot in end-to-end communicating relationship, a drawing chamber extending upwardly from said drawpot and having side walls provided with an access opening in the area above said draw-pot, a closure panel located in said opening, the closure panel being of double wall construction with said panel walls being spaced apart by a partitioning wall, a port in said partitioning wall, an aperture in the outer wall of said panel, and means for exhausting air from the interior of said panel through said aperture.

13. In a sheet glass drawing machine, a draw-pot containing a mass of molten glass, a drawing chamber above said draw-pot defining a zone of sheet formation and including side walls provided with an access opening, means for drawing a sheet upwardly from said molten glass through said drawing chamber including working elements for drawing said sheet and maintaining said sheet at a desired width, said working elements including a portion which extends through said access opening for support and connection to power and cooling sources outwardly of said drawing chamber, closure panels of double wall construction with an air space therebetween sealing said opening while providing an aperture for receiving said portion of said working elements extending through said opening, a hollow housing surrounding said portion of said working elements and opening into said drawing chamber in abutting sealed relationship with said aperture provided in said closure panels for receiving said portion of said working elements, and means communicating with the interior of said housing outwardly of said drawing chamber for withdrawing air from the interior of said housing.

References Cited
UNITED STATES PATENTS

| | | | |
|---|---|---|---|
| 1,399,547 | 12/1921 | Ewing | 65—196 |
| 1,466,460 | 8/1923 | Whittemore | 65—197 |
| 1,522,708 | 1/1925 | Andrews | 52—615 |
| 2,201,286 | 5/1940 | Bundy | 65—91 |
| 3,257,189 | 6/1966 | Zellers | 65—196 |

DONALL H. SYLVESTER, *Primary Examiner.*

S. LEON BASHORE, *Examiner.*

G. R. MYERS, *Assistant Examiner.*